United States Patent
Kasargod et al.

(10) Patent No.: US 8,825,397 B2
(45) Date of Patent: Sep. 2, 2014

(54) VEHICLE NAVIGATION SYSTEM WITH DEAD RECKONING

(71) Applicant: Texas Instruments Incorporated, Dallas, TX (US)

(72) Inventors: Sandeep Kasargod, Bangalore (IN); Sandeep Rao, Bangalore (IN); Karthik Ramasubramanian, Bangalore (IN); Tarkesh Pande, Dallas, TX (US); Sriram Murali, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/668,381

(22) Filed: Nov. 5, 2012

(65) Prior Publication Data

US 2013/0116921 A1  May 9, 2013

(30) Foreign Application Priority Data

Nov. 3, 2011 (IN) .............................. 3774/CHE/2011

(51) Int. Cl.
*G01C 21/12* (2006.01)
*G01C 21/16* (2006.01)

(52) U.S. Cl.
CPC .............. *G01C 21/12* (2013.01); *G01C 21/165* (2013.01)
USPC ........... 701/472; 701/445; 701/468; 701/473; 701/495; 340/995.25; 342/357.23

(58) Field of Classification Search
USPC .............. 701/40, 445, 468, 472, 495; 702/94; 340/995.1–996; 342/357.22–357.31
See application file for complete search history.

(56) References Cited

U.S. PATENT DOCUMENTS

| | | | | |
|---|---|---|---|---|
| 5,416,712 | A | * | 5/1995 | Geier et al. .................... 701/472 |
| 5,752,220 | A | * | 5/1998 | Geier ............................ 701/495 |
| 5,862,511 | A | * | 1/1999 | Croyle et al. ................. 701/445 |
| 7,184,887 | B2 | * | 2/2007 | Wood et al. ................... 701/469 |
| 2012/0221244 | A1 | * | 8/2012 | Georgy et al. ................ 701/472 |
| 2012/0296539 | A1 | * | 11/2012 | Cooprider et al. ............. 701/70 |

* cited by examiner

*Primary Examiner* — Thomas Tarcza
*Assistant Examiner* — Tyler J Lee
(74) *Attorney, Agent, or Firm* — Ronald O. Neerings; Frederick J. Telecky, Jr.

(57) ABSTRACT

A vehicle navigation system includes a GNSS position engine (GPE) that uses GNSS satellite measurements to compute a first position and velocity of a vehicle and a first quality metric associated with the position and velocity. The system also includes a dead reckoning engine (DRE) that operates parallel with the GPE that computes a second position and velocity and a second quality metric associated with the dead reckoning. The GPE is configured to use the second position and velocity to detect a set of outliers in an incoming GNSS measurement; use the second position and velocity as an initial estimate of its position and velocity for a particular time instant, which is then refined by GNSS measurements received at that particular time instant; and to replace the first position and velocity with the second position and velocity.

13 Claims, 2 Drawing Sheets

VEHICLE NAVIGATION SYSTEM WITH DEAD RECKONING

TECHNICAL FIELD

Embodiments of the disclosure relate a to vehicle navigation system and particularly to dead reckoning in a vehicle navigation system.

BACKGROUND

Modern users rely on global navigation satellite system (GNSS) enabled personal navigation devices (PNDs) or other GNSS-equipped electronic devices such as cell phones to navigate while in motion. Consequently, users require a high degree of accuracy in a wide range of navigation scenarios. However, effective GNSS-based navigation is reduced in areas where signal transmission is hindered, such as in tunnels, or in 'urban canyons', where signal transmission is reduced by artificial canyons formed by surrounding buildings.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An example embodiment provides a vehicle navigation system that includes a GNSS position engine (GPE) that uses GNSS satellite measurements to compute a first position and velocity of a vehicle and a first quality metric associated with the position and velocity. The navigation system also includes a dead reckoning engine (DRE) that operates in parallel with the GPE that computes a second position and velocity and a second quality metric associated with the dead reckoning. Given an initial position and heading, the DRE computes subsequent position and velocity of the vehicle using yaw rate and speed measurements (for e.g. based on automotive sensors) and information about the map network. The GPE is configured to (a) use the second position and velocity to detect a set of outliers in an incoming GNSS measurement; (b) use the second position and velocity as an initial estimate of its position and velocity for a particular time instant, which is then refined by GNSS measurements received at that particular time instant; and (c) replace the first position and velocity with the second position and velocity.

Another example embodiment provides a method of computing a quality metric for a sensor and map based dead reckoning in a vehicle navigation system. First, a position uncertainty of a dead reckoned position that seeds dead reckoning is initialized. Then, the position uncertainty is increased by a fraction of a distance travelled along a road segment when the vehicle is traveling in a current road segment. Further, the position uncertainty is increased by a certain amount when a lane change by the vehicle is detected. Then, the position uncertainty is reinitialized when a new road segment is identified subsequent to a turn from the current road segment. The quality metric is used in conjunction with sensor information from the vehicle, a map database and GNSS measurements for accurate positioning of the vehicle navigation system.

Yet another example embodiment provides a method of vehicle navigation to remove erroneous satellite measurements in a vehicle navigation system. First, a direction of a vehicle at an instant is identified. A sequence of displacements is then calculated, at one or more subsequent instances, from an initial position of the vehicle using speed and yaw rate measurements. Further, the sequence of displacements is used to relate a set of GNSS pseudorange measurements from the instant to the one or more subsequent instances, to the initial position of the vehicle navigation system. Inconsistent GNSS psuedorange measurements are then detected and removed. Then, a set of remaining psuedorange measurements are used to compute the initial position of the vehicle navigation system.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Figure 1:
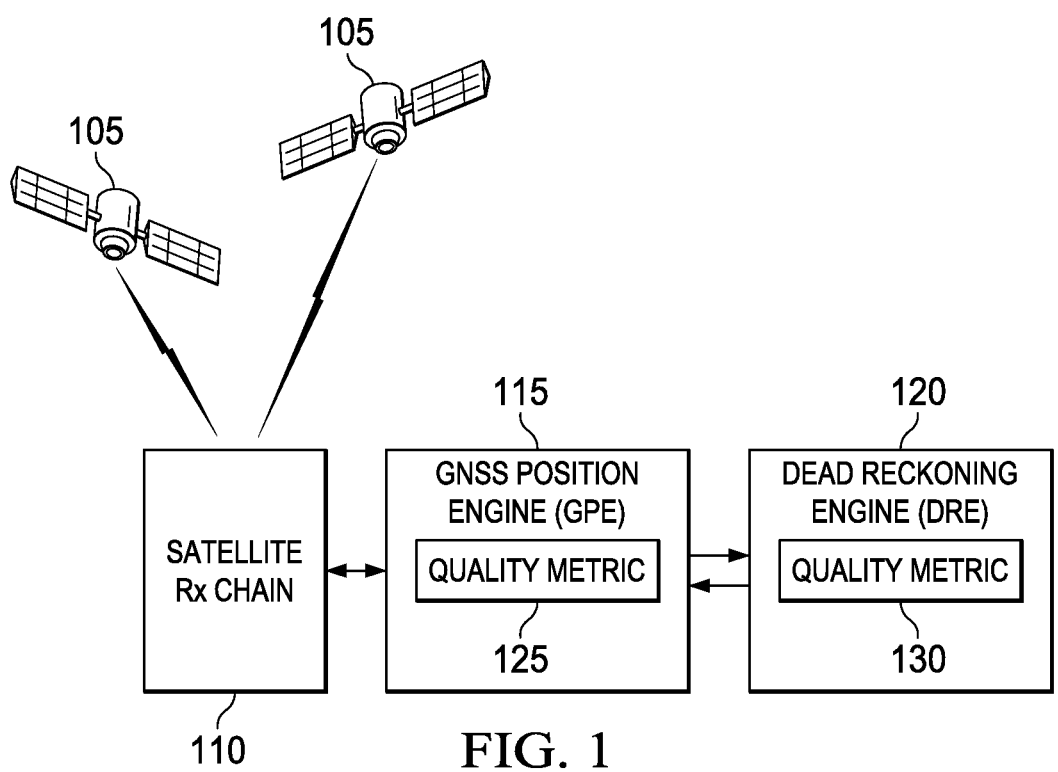
FIG. 1 illustrates a vehicle navigation system according to an embodiment.

FIG. 1 illustrates a vehicle navigation system according to an embodiment. The vehicle navigation system includes a satellite receiver chain 110, a GNSS position engine (GPE) 115 and a dead reckoning engine (DRE) 120. The satellite receiver chain 110 includes an antenna, amplifiers, ADC and digital logic and firmware to acquire and track signals from the satellites 105. The satellite receiver chain 110 sends the GNSS satellite measurements (consisting of measured psuedoranges and psuedorange rate) to the GPE 115. The satellite receiver chain 110 also computes a quality metric for each psuedorange/Doppler measurement which is also communicated to the GPE 115. The GPE 115 uses GNSS satellite measurements to compute a position and velocity of the vehicle, and a quality metric 125 (first quality metric) associated with the position and velocity.

The DRE 120 uses a seed position and heading and computes the position and velocity at subsequent instances using speed and yaw rate measurements and information about the local road network from a map database. The DRE 120 also computes a quality metric 130 (second quality metric, in meters) associated with the dead reckoning.

The DRE 120 and the GPE 115 operate in parallel with the GPE computing a first position, velocity and quality metric and the DRE computing a second position, velocity and quality metric. In scenarios where GNSS signal reception is poor (such as in urban canyons) the GPE may find it difficult to provide a reliable position estimate using only GNSS measurements. Under such conditions, the GPE 115 is configured to use the position and velocity estimates provided by the DRE to enhance the quality of its own position and velocity estimates. There are several ways in which this can be done as described below.

In one embodiment, the GPE 115 uses the position and velocity from the DRE 120 to detect a set of outliers from the incoming GNSS measurements. For each satellite psuedorange measurement received from the satellite receiver chain 110, the GPE 115 corrects this psuedorange based on its best current estimate of the receiver clock bias. The GPE 115 also calculates the distance between the position provided by the DRE and the satellite position. The difference between this distance and the corrected psuedorange provides an estimate of the error in the incoming psuedorange measurement. This error estimate is used to reject the pseudorange measurement (i.e. by not sending it to a position filter such as a Kalman Filter). Alternatively, the error estimate is used to suitably modify the quality metric associated with this measurement prior to sending it to the position filter. A similar technique can be employed to detect outliers in psuedorange rate measurements.

The GPE 115 also uses the position and velocity from the DRE 120 to get an initial 'rough' estimate of its position and velocity at a particular time instant. In the context of the Kalman Filter, this could mean using the position and velocity estimate of the DRE 120 as the predicted state of the filter. The position and velocity are then subsequently refined using the GNSS measurements which are sent to the Kalman Filter.

In situations where there is complete loss of GNSS signal (such as in tunnels) or where the GPE 115 finds that its position and/or velocity estimate are very unreliable, the GPE is configured to replace its position and velocity estimate with the corresponding estimates from the DRE 120.

It is noted that the DRE 120 needs a seed position and heading to start the process of dead reckoning. Subsequently as the duration of dead reckoning increases, the accuracy of the dead reckoned position can deteriorate. This is captured in the quality metric computed by the DRE 120 which is explained in detail later in the specification. The DRE 120 is configured to opportunistically seek out a new reliable position and heading from the GPE to re-seed its dead reckoning. The DRE 120 compares the quality metric from the GPE 115 with its own quality metric 130. As an additional validation, the DRE 120 also checks if the GPE's recent fixes, including the current one, correspond to a trajectory on a map network. If the DRE 120 finds that the quality metric 125 from the GPE 115 is better than its own quality metric 130 and also the above validation has passed, then the DRE 120 may reseed its position and heading with that of the GPE 115.

Battery life is a key care-about in portable electronic devices such as cell phones and personal navigation devices (PND). Consequently, it is useful to minimize the power consumed during vehicle navigation in such devices. The satellite receiver chain 110 tends to be the most power hungry part of the vehicle navigation system. In order to save power, in one embodiment, the vehicle navigation system is configured to put the satellite receiver chain (and the GPE) in a "sleep state" for a certain period of time. During this period the vehicle navigation system navigates using the position and velocity output of the DRE.

Between periods of dead reckoning, the vehicle navigation system is configured to bring the GPE 115 and satellite receiver chain 110 into an active state. Once the satellite receiver chain is brought into an active state it provides GNSS measurements to the GPE 115 which then computes a position and velocity fix. Once a fix of sufficiently good quality is found, this is used to seed the DRE 120. Subsequently the satellite receiver chain and GPE 115 is configured to go into the sleep state again.

After entering the sleep state, the satellite receiver chain 110 and the GPE 115 are configured to enter the active state after a fixed period. Alternatively, the DRE 120 monitors its quality metric and enters the active state only once the quality metric falls below a certain threshold. The active state can also be entered when the DRE 120 detects that it is entering a region in the map network where map based dead reckoning can be difficult or potentially ambiguous (for e.g. when the DRE 120 is approaching an intersection where the difference in degrees between possible turns is less than a certain threshold or distance between forthcoming intersections is less than another threshold).

Figure 2:
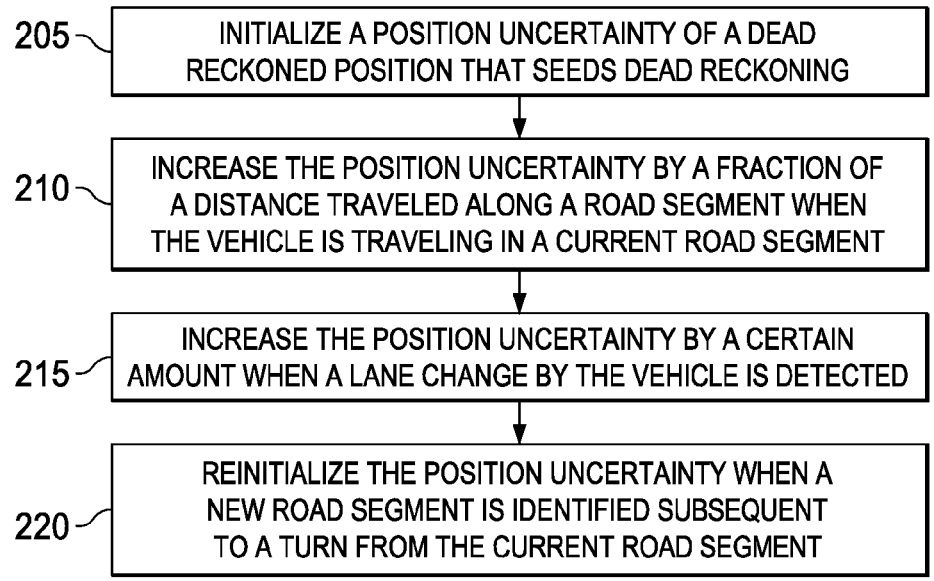
FIG. 2 is a flowchart illustrating a method for computing a quality metric for a sensor and map based dead reckoning in a vehicle navigation system according to an embodiment.

Referring now to FIG. 2, the flowchart illustrates the steps involved in computing the quality metric 130 associated with the DRE 120. At step 205, the quality metric is initialized to the position uncertainty (in meters) of the position that seeds the dead reckoning. As long as no turn is detected, the DRE 120 navigates by moving the position along the current road segment using the speed measurements. During this period, as illustrated in step 210, the position uncertainty is increased by a certain fraction of the distance of the travelled on the current road segment. This fraction is determined by the accuracy with which the speed measurements have been calibrated. Additionally, at step 215, the position uncertainty is increased whenever a lane change is detected (based on yaw measurements). Therefore, as long as the vehicle is travelling on the current road segment, the position uncertainty keeps increasing. Whenever a turn is detected and consequently a new road segment identified the position uncertainty is reset to a fixed value. This is performed at step 220.

The following paragraphs describe in more detail the working of the DRE 120. As described earlier, as long as no turn is detected, the DRE 120 navigates by moving the position along the current road segment using the speed measurements. The DRE communicates with a turn detection engine (TDE) which uses the yaw measurements to detect turns in the vehicle. The TDE monitors the sequence of yaw measurements and may generate a "start of turn" signal whenever the cumulative yaw change over a certain time or distance exceeds a threshold or alternatively if the instantaneous yaw reading exceeds a certain threshold. It is noted that the TDE is part of the vehicle navigation system and is not shown in the figures. The DRE 120, on receiving a "start of turn" signal from the TDE, stores the last known position of the vehicle. The DRE retains this last known position of the vehicle until it receives an "end of turn" signal from the TDE. The TDE generates an "end of turn" signal whenever the cumulative turn over a certain time or distance falls below a certain threshold or alternatively if the instantaneous yaw reading falls below a certain threshold. Subsequently, the DRE identifies from a map database, the nearest intersection on the current road segment and the new road segment at this intersection based on a set of conditions that are described below according to an embodiment.

These conditions, which are meant to ensure that there is no ambiguity in the selection of the new road segment, include (a) checking if the nearest intersection is within a first threshold from the last known position of the vehicle, wherein the first threshold is based on distance; (b) checking if there is a turn at the nearest intersection that matches with a cumulative angle of the turn within a second threshold, wherein the second threshold is based on the cumulative angle; and (c) checking to confirm that there are no other turns than the turn at the nearest intersection, within a certain angle of the turn. If one or more of the above conditions are not met, the DRE can suspend the dead reckoning and wait for a new position and heading to seed its dead reckoning. Sometimes the vehicle navigation system may encounter a situation where the neither the DRE 120 nor the GPE's 115 position filter have a reliable position estimate. In such a situation the GPE 115 needs to acquire a fresh position and velocity fix. The following paragraphs describe a method to achieve this with accuracy, according to an embodiment.

'Receiver Autonomous Integrity Monitoring' (RAIM) is an algorithm which removes erroneous (say multipath affected) satellite measurements. It works by doing a consistency check across satellite measurements. Current RAIM techniques can only compare measurements from a single epoch. However these techniques cannot work seamlessly and optimally across multiple epochs. Yaw and speed sensors readings from vehicle sensors provide good accuracy for dead reckoning across several 10's of seconds. This makes it possible to mathematically relate position and velocity across multiple epochs. In turn this enables the application of RAIM across multiple epochs (MultiEpoch RAIM') where the receiver is able to identify erroneous measurements from an entire set of measurements spanning multiple time epochs (say 0 to T). Once the erroneous measurements have been identified the remaining measurements (from 0 to T) in conjunction with the yaw rate and speed measurements (from 0 to T) can be used to determine the position and velocity of the vehicle at all instants between time 0 and T.

Let $\{x(t),y(t),z(t)\}$ denote the user position at time t. Also let $\{d_x(t), d_y(t), d_z(t)\}$ denote user displacement from time t to t+1. Thus $$x(t+1)=x(t)+d_x(t)$$

$$y(t+1)=y(t)+d_y(t)$$

$$z(t+1)=z(t)+d_z(t)$$

Given psuedorange measurements from various satellites from t=0 to T and assuming full knowledge of $\{d_x(t), d_y(t), d_z(t)\}$ $0<=t, <=T$, we need to estimate the initial position of the user $\{x(0),y(0),z(0)\}$. The sequence $\{d_{x(t)}, d_{y(t)}, d_{z(t)}\}$ can be computed with knowledge of the initial heading $(\theta O_o)$ of the vehicle and the yaw rate $(\Delta\theta(t))$ and speed $(s(t))$ readings from t=0 to T($d_x(t)=s(t) \cos(\theta_o+\Sigma_{k=o}^t \Delta\theta(k)$, etc.)

For a psuedorange measurement $p_s(t)$ from satellite s at time t, it is possible to write an equation relating various quantities as follows, c(t) being the clock bias in meters at time t:

$$\sqrt{[x(t)-x_s(t)]^2 + [y(t)-y_s(t)]^2 + [z(t)-z_s(t)]^2} + c(t) = p_s(t)$$

Now using the fact that $x(t)=x(0)+\Sigma_0^t d(k)$, etc and $c(t)=c(0)+ft$, where c(0) is the initial clock bias (expressed in meters) and f is the clock drift (expressed in meters/sec and as yet unknown), the above equation can be rewritten as $$\sqrt{\left[x(0)+\sum_0^t d_x(k) - x_s(t)\right]^2 + \left[y(0)+\sum_0^t d_y(k) - y_s(t)\right]^2 + \left[z(0)+\sum_0^t d_z(k) - z(t)\right]^2} + c(0) + ft = p_s(t)$$

The above equation can be linearized around a certain estimate of the initial state $\{x^{est}(0), y^{est}(0), z^{est}(0), c^{est}(0)\}$, to give the following equation $$\frac{\left[x^{est}(0)+\sum_0^t d_x(k) - x_s(t)\right]}{r}\Delta x + \frac{\left[y^{est}(0)+\sum_0^t d_y(k) - y_s(t)\right]}{r}\Delta y +$$

$$\frac{\left[z^{est}(0)+\sum_0^t d_z(k) - z_s(t)\right]}{r}\Delta z + \Delta c + f = \Delta p_s(t)$$

where, $$r = \sqrt{\left[z^{est}(0)+\sum_0^t d_z(k) - x_s(t)\right]^2 + \left[y^{est}(0)+\sum_0^t d_y(k) - y_s(t)\right]^2 + \left[z^{est}(0)+\sum_0^t d_z(k) - z_s(t)\right]^2}$$

$\Delta p_s(t)$ is the psuedorange residual which is the difference between the measured psuedorange and the computed psuedorange from the satellite s to the estimated initial state. $\{\Delta x, \Delta y, \Delta z, \Delta c, f\}$ denotes the unknown updates to the initial state estimate that we are trying to solve for Further simplification of the above equation using the direction cosine matrix notation yields: $h_s^x(t)\Delta x + h_s^y(t)\Delta y + h_s^z(t)\Delta z + \Delta c + f = \Delta p_s(t)$ where $[h_s^x(t)\ h_s^y(t)\ h_s^z(t)]$ is the direction cosine vector of the satellite s at time t. Thus every psuedorange measurement from any satellite from time 0 through T provides us with a linear constraint on the 5 unknowns $\{\Delta x, \Delta y, \Delta z, \Delta c, f\}$. This linear system of equations can then be used to estimate $\{\Delta x, \Delta y, \Delta z, \Delta c\}$ as follows: First apply any of the well known RAIM techniques recursively to isolate outlier equations from a set of linear constraints. Secondly, calculate a Least Squares or Weighted Least Squares solution using the non-outliers equations.

Figure 3:
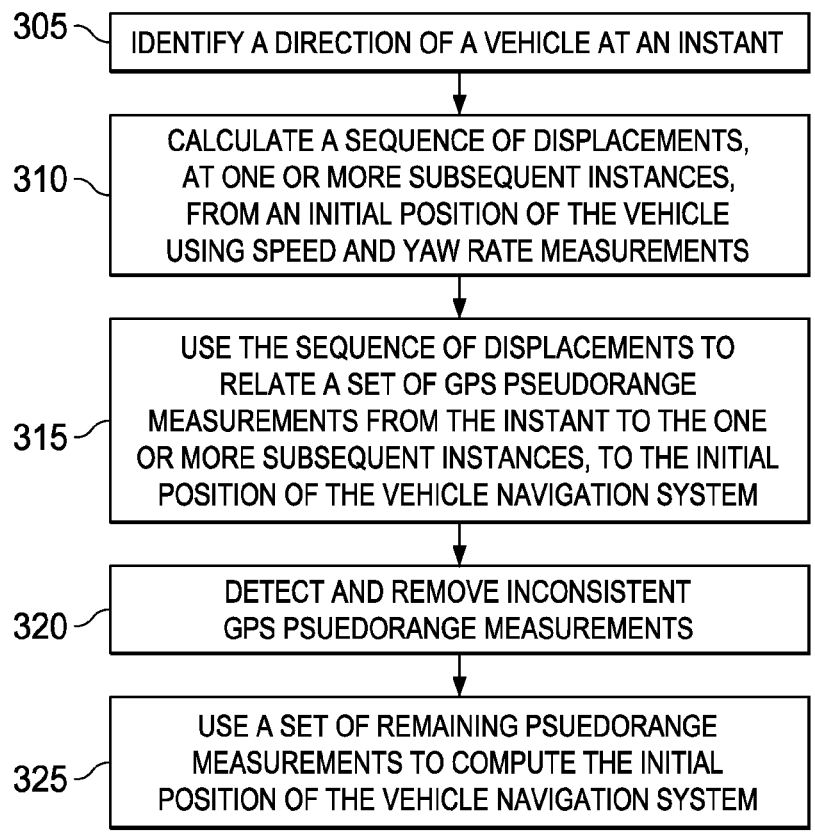
FIG. 3 is a flowchart illustrating a method for removing erroneous satellite measurements in a vehicle navigation system according to an embodiment.

Referring now to FIG. 3, the flowchart illustrates the method described above for detecting outlier measurements and subsequently computing a position and velocity estimate. At step 305, the method is initialized with a known direction of the vehicle at an instant (say T=0). At step 310, a sequence of displacements ($\{d_x(t), d_y(t), d_z(t)\}$) is calculated at one or more subsequent instances (say 1 through T) from an initial position of the vehicle ($\{x(0),y(0),z(0)\}$) using the speed and yaw rate measurements. At step 315, the sequence of displacements are used to relate a set of GNSS psuedorange measurements from t=0 through T, to the initial position of the vehicle (as described earlier). At step 320, inconsistent measurements are detected and removed by identifying outliers constraints from the set of linear constraints. Finally at step 325, the remaining psuedorange measurements are used to compute the initial position of the vehicle.

The method described above assumed knowledge of the initial heading of the vehicle. The following paragraph describes a method for estimating this initial heading according to an embodiment. The doppler measured on every satellite directly relates to the relative motion between the satellite and the user along the line joining the two. Hence, for every doppler measurement $pr_s(t)$ (expressed in meters/sec) from a satellite s at time t, the following equation can be written, in the unknowns $\Theta_o$ and the clock drift f.

$$h_s^e(t) \cdot [s(t)\cos(\theta_o+\Sigma_{k=0}^t \Delta\theta(k))-v_s^e] + \cdot [s(t)\sin(\theta_o+\Sigma_{k=0}^t \Delta\theta(k))-v_s^n]-f=pr_s(t).$$

Here $[h_s^e(t) h_s^n(t)]$ is the east and north component of the direction cosine matrix of the satellite s at time t, and f is the clock drift of the receiver. Note that, in this formulation, we assume that clock drift to be a constant, though other formulations are possible (such as a linearly changing clock drift (a+bt) etc.). Here the up velocity of the user is assumed to be negligible.

It is noted that for every doppler measurement received in the time interval (0, T) one can write an equation such as the one above involving the unknowns $\Theta_o$ and f . This set of equations are now used to first identify and remove equations resulting from outlier measurements and then use the remaining equations to solve for the unknowns. Two methods of achieving this are described below.

In one method, according to an embodiment, various values of $\Theta_o$ are hypothesized in the range 0°-360° (say in increments of 1°). Every such hypothesis yields a system of linear equations with just one unknown (f). The outlier equations can be eliminated now from these set of linear equations and the remaining equations can be used to solve for f in a least square (or weighted least square) sense. This is done for every hypothesis. For each hypothesis a quality metric is calculated which takes into account (a) the number of equations that remain after eliminating outliers. (b) the mean square error of the least square (or weighted least square) solution using these remaining equations. The hypothesis with the best quality metric is used as an estimate $\Theta_o$ and f.

In another method, according to an embodiment, an apriori approximate estimate of $\Theta_o$ is used to linearize the trigonometric terms (sin( )and cos( ) around this estimate using first order approximations (sin($\Theta$)=$\Theta$ and cos($\Theta$)=1). This results in a set of linear equations, from which outlier equations can be detected, and the remaining equations used to solve for $\Theta_o$ A method for estimating the initial heading, according to an embodiment is described now. A sequence of headings, at one or more subsequent instances, in terms of the heading of the vehicle at that instant (say $\Theta_o$) are calculated, using yaw rate measurements. Then, as described previously, these sequences of headings are used to relate a set of GNSS doppler measurements from the instant to one or more subsequent instances, to the initial heading of the vehicle at the instant. Further, these relations are used to detect and eliminate outlier doppler measurements. Lastly, the remaining doppler measurements are used to solve for the initial heading of the vehicle ($\Theta_o$).

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A vehicle navigation system comprising:
a GNSS position engine (GPE) that uses GNSS satellite measurements to compute a first position and velocity of a vehicle and a first quality metric associated with the position and velocity, wherein the GNSS satellite measurements comprises psuedorange measurements and pseudorange rate measurements;
a dead reckoning engine (DRE) that operates parallel with the GPE, and computes a second position and velocity and a second quality metric associated with the dead reckoning;
wherein in the GPE is configured to:
use the second position and velocity to detect a set of outliers in an incoming GNSS measurement;
use the second position and velocity as an initial estimate of its position and velocity for a particular time instant, which is then refined by GNSS measurements received at that particular time instant; and
replace the first position and velocity with the second position and velocity.

2. The vehicle navigation system of claim 1, wherein the DRE is configured to seed its dead reckoning with the first position and velocity; and to compare the first quality metric with the second quality metric prior to reseeding its position and velocity with the position and velocity of the GPE, and configured to check if the GPEs recent fixes, including a current one, correspond to a trajectory on a map network.

3. The vehicle navigation system of claim 1, wherein the GPE detects the set of outliers in the incoming GNSS measurements by checking the consistency between each of the psuedorange measurements and the position computed by the DRE; and by checking the consistency between each of the pseudorange rate measurements and the velocity computed by the DRE.

4. The vehicle navigation system of claim 1, wherein, the GPE and the satellite receiver chain is configured to be in a sleep state for a period of time to save power.

5. The vehicle navigation system of claim 4, wherein the GPE and the satellite receiver chain is configured to be in an active state after the sleep state based on one of a condition:
when the quality of the DREs position as determined by the second quality metric falls below a threshold;
when the DRE is approaching an intersection where the difference in degrees between possible turns is less than another threshold; and
when the DRE is approaching a set of intersections where the distance between consecutive intersections is less than yet another threshold.

6. The vehicle navigation system of claim 4, wherein the first and second quality metric is computed in units of distance.

7. A vehicle navigation system comprising:
a GNSS position engine (GPE) that uses GNSS satellite measurements to compute a first position and velocity of a vehicle and a first quality metric associated with the position and velocity, wherein the GNSS satellite measurements comprises psuedorange measurements and pseudorange rate measurements;
a dead reckoning engine (DRE) that operates parallel with the GPE, and computes a second position and velocity and a second quality metric associated with the dead reckoning;
wherein in the GPE is configured to:
use the second position and velocity to detect a set of outliers in an incoming GNSS measurement;
use the second position and velocity as an initial estimate of its position and velocity for a particular time instant, which is then refined by GNSS measurements received at that particular time instant; and
replace the first position and velocity with the second position and velocity wherein the DRE is configured to compute the second quality metric by:
initializing a position uncertainty of a dead reckoned position that seeds dead reckoning;
increasing the position uncertainty by a fraction of a distance travelled along a road segment when the vehicle is traveling in a current road segment;
increasing the position uncertainty by a certain amount when a lane change by the vehicle is detected; and
reinitializing the position uncertainty when a new road segment is identified subsequent to a turn from the current road segment, wherein the quality metric is used in conjunction with sensor information from the vehicle, a map database and GNSS measurements for accurate positioning of the vehicle navigation system.

8. The vehicle navigation system of claim 7, wherein the sensor and map based dead reckoning comprises:
receiving, at a dead reckoning engine, a start of a turn signal when the vehicle starts a turn on a current road segment;
storing a last known position of the vehicle;

receiving an end of turn signal when the vehicle finishes the turn; and identifying, from a map database, a nearest intersection in the current road segment and the next road segment at this intersection based on satisfaction of a set of conditions.

9. The vehicle navigation system of claim 8, wherein the set of conditions comprises:

checking if the nearest intersection is within a first threshold from the last known position of the vehicle, wherein the first threshold is based on distance;

checking if there is a turn at the nearest intersection that matches with a cumulative angle of the turn within a second threshold, wherein the second threshold is based on the cumulative angle; and checking to confirm that there are no other turns than the turn at the nearest intersection, within a certain angle of the turn.

10. The vehicle navigation system of claim 8, wherein a turn detection engine generates the start of a turn signal and the end of a turn signal and calculates the cumulative angle.

11. The vehicle navigation system of claim 7, wherein increasing the position uncertainty by a fraction of a distance travelled along a road segment comprises calculating the fraction by calibrating a wheel tick sensor that provides a speed input.

12. The vehicle navigation system of claim 7, wherein generating the start of a turn signal comprises:

monitoring a sequence of yaw rate readings from a gyroscope; and generating the start of the turn signal when a set of parameters exceeds a third threshold, wherein the set of parameters comprises one of a cumulative turn in time or distance and yaw rate readings.

13. The vehicle navigation system of claim 7, wherein generating the end of turn signal comprises:

accumulating the sequence of yaw rate readings; and detecting an end of turn event when a set of parameters falls below a fourth threshold, wherein the set of parameters comprises one of a cumulative turn in time or distance and yaw rate readings.

* * * * *